United States Patent
Humer et al.

(10) Patent No.: US 7,621,598 B2
(45) Date of Patent: Nov. 24, 2009

(54) ADJUSTABLE HEAD RESTRAINT FOR A VEHICLE SEAT

(75) Inventors: Mladen Humer, West Bloomfield, MI (US); Gerald S. Locke, Lake Orion, MI (US); Arjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 156 days.

(21) Appl. No.: 11/538,114

(22) Filed: Oct. 3, 2006

(65) Prior Publication Data

US 2008/0079294 A1 Apr. 3, 2008

(51) Int. Cl.
A47C 7/36 (2006.01)
B60R 22/28 (2006.01)
B60N 2/48 (2006.01)
(52) U.S. Cl. .................... 297/410; 297/216.12
(58) Field of Classification Search ............. 297/410, 297/216.12
See application file for complete search history.

(56) References Cited

U.S. PATENT DOCUMENTS

| | | | |
|---|---|---|---|
| 4,222,608 A | 9/1980 | Maeda | |
| 4,671,573 A | 6/1987 | Nemoto et al. | |
| 4,779,929 A | 10/1988 | Kuchemann | |
| 5,052,754 A | 10/1991 | Chinomi | |
| 5,071,190 A | 12/1991 | Tame | |
| 5,681,079 A | 10/1997 | Robinson | |
| 5,927,804 A | 7/1999 | Cuevas | |
| 6,074,011 A | 6/2000 | Ptak et al. | |
| 6,192,565 B1 | 2/2001 | Tame | |
| 6,447,068 B1 | 9/2002 | Anderson et al. | |
| 6,573,673 B1 | 6/2003 | Hampel et al. | |
| 6,631,956 B2 | 10/2003 | Mauro et al. | |
| 6,789,846 B2 * | 9/2004 | Humer et al. | ....... 297/216.12 X |
| 6,880,891 B2 | 4/2005 | Yetukuri et al. | |
| 6,899,395 B2 | 5/2005 | Yetukuri et al. | |
| 6,955,397 B1 | 10/2005 | Humer | |
| 6,983,989 B1 | 1/2006 | Veine et al. | |
| 6,983,996 B2 | 1/2006 | Svantesson | |
| 7,204,552 B2 * | 4/2007 | Ishizuka | ............. 297/216.12 X |
| 7,267,407 B1 * | 9/2007 | Demick et al. | .......... 297/410 X |
| 2003/0001414 A1 | 1/2003 | Humer et al. | |

(Continued)

FOREIGN PATENT DOCUMENTS

DE 3625691 A1 2/1988

(Continued)

OTHER PUBLICATIONS

UK Intellectual Property Office Search and Examination Report for corresponding Application No. GB0719156.2, mailed Jan. 31, 2008, 6 pages.

(Continued)

*Primary Examiner*—Anthony D Barfield
(74) *Attorney, Agent, or Firm*—Brooks Kushman P.C.

(57) ABSTRACT

A vehicle seat and head restraint are disclosed with a head restraint that is mounted to a pair of rods that are fixed relative to the vehicle seat. The head restraint is translatable along the rods and includes a locking mechanism for locking the head restraint at a plurality of locations along the rods. In one embodiment, the rods are mounted to an armature of a restraint mechanism for actuating the head restraint in response to an impact condition.

12 Claims, 3 Drawing Sheets

U.S. PATENT DOCUMENTS

| | | |
|---|---|---|
| 2003/0011224 A1 | 1/2003 | Humer et al. |
| 2003/0015897 A1 | 1/2003 | Humer et al. |
| 2004/0119324 A1 | 6/2004 | Humer et al. |
| 2005/0156456 A1 | 7/2005 | Robinson et al. |
| 2006/0071517 A1 | 4/2006 | Humer et al. |
| 2006/0071518 A1 | 4/2006 | Hippel et al. |
| 2006/0103189 A1 | 5/2006 | Humer et al. |

FOREIGN PATENT DOCUMENTS

| | | |
|---|---|---|
| EP | 0970846 A1 | 1/2000 |
| GB | 2418843 A | 4/2006 |
| WO | 2005068252 A1 | 7/2005 |

OTHER PUBLICATIONS

German Office Action for corresponding German Application No. 10 2007 034 961.2, mailed Mar. 19, 2009.

\* cited by examiner

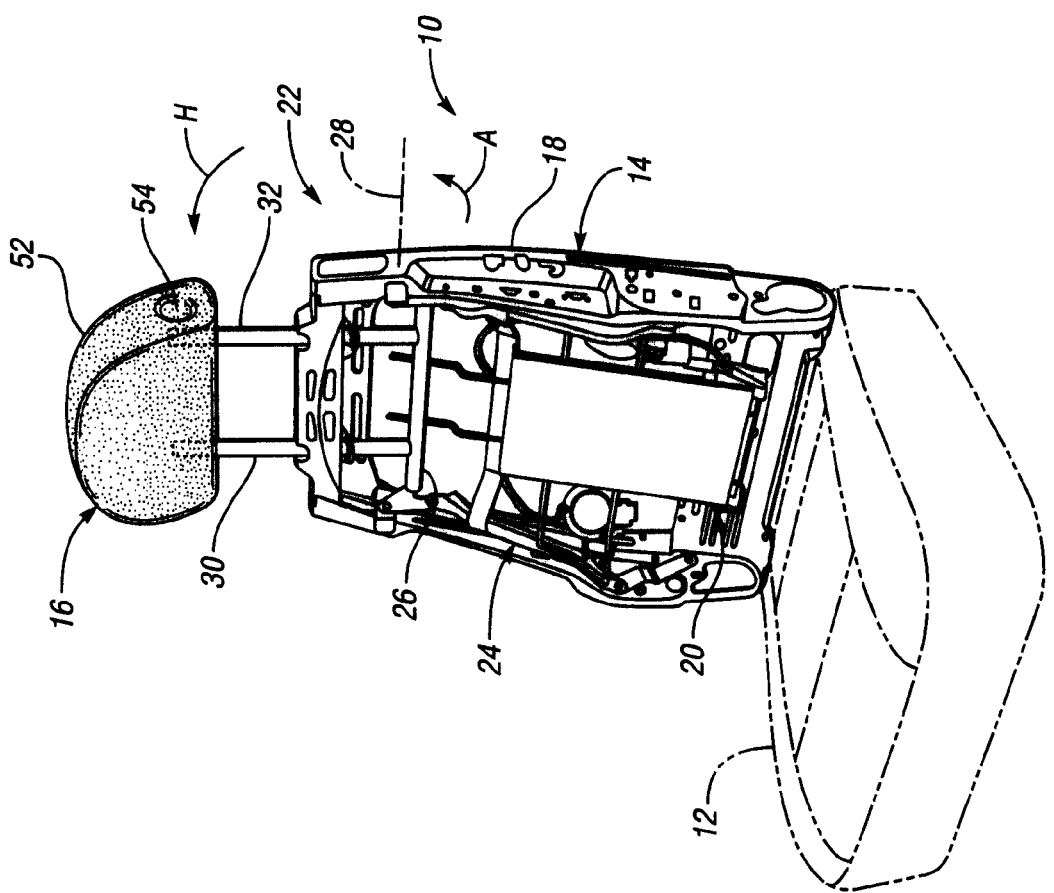
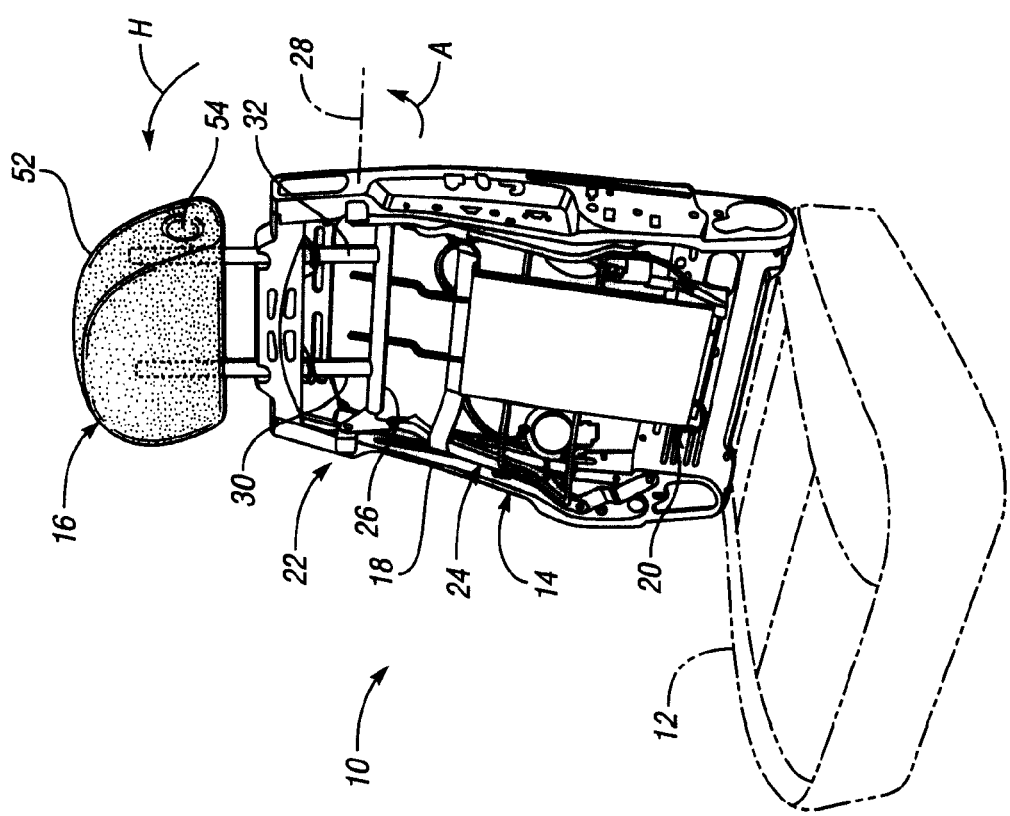

ADJUSTABLE HEAD RESTRAINT FOR A VEHICLE SEAT

BACKGROUND OF THE INVENTION

1. Field of the Invention

The invention relates to head restraints for vehicle seats, more particularly to adjustable head restraints.

2. Background Art

Adjustable head restraints for vehicle seats are provided for comfort and safety of an occupant. For example, U.S. Pat. No. 6,631,956 B2, which issued on Oct. 14, 2003, discloses an adjustable head restraint with a rod that supports the head restraint and translates relative to sleeves of the seatback.

Another offering of the prior art is a head restraint that is adjustable upon posts that extend from the seatback. The posts are received within receptacles of the seatback and the posts are also adjustable relative to the receptacles. The head restraint includes a detent mechanism for maintaining a position of the head restraint relative to the posts; and the receptacles include a locking mechanism for locking the posts relative to the receptacles.

BRIEF DESCRIPTION OF THE DRAWINGS

FIG. 1 is a perspective view of a vehicle seat in accordance with the present invention, illustrated with a head restraint oriented at a first position relative to a seatback;

FIG. 2 is another perspective view of the vehicle seat of FIG. 1, illustrating the head restraint at a second position relative to the seatback;

DESCRIPTION OF EMBODIMENTS OF THE INVENTION

Figure 3:
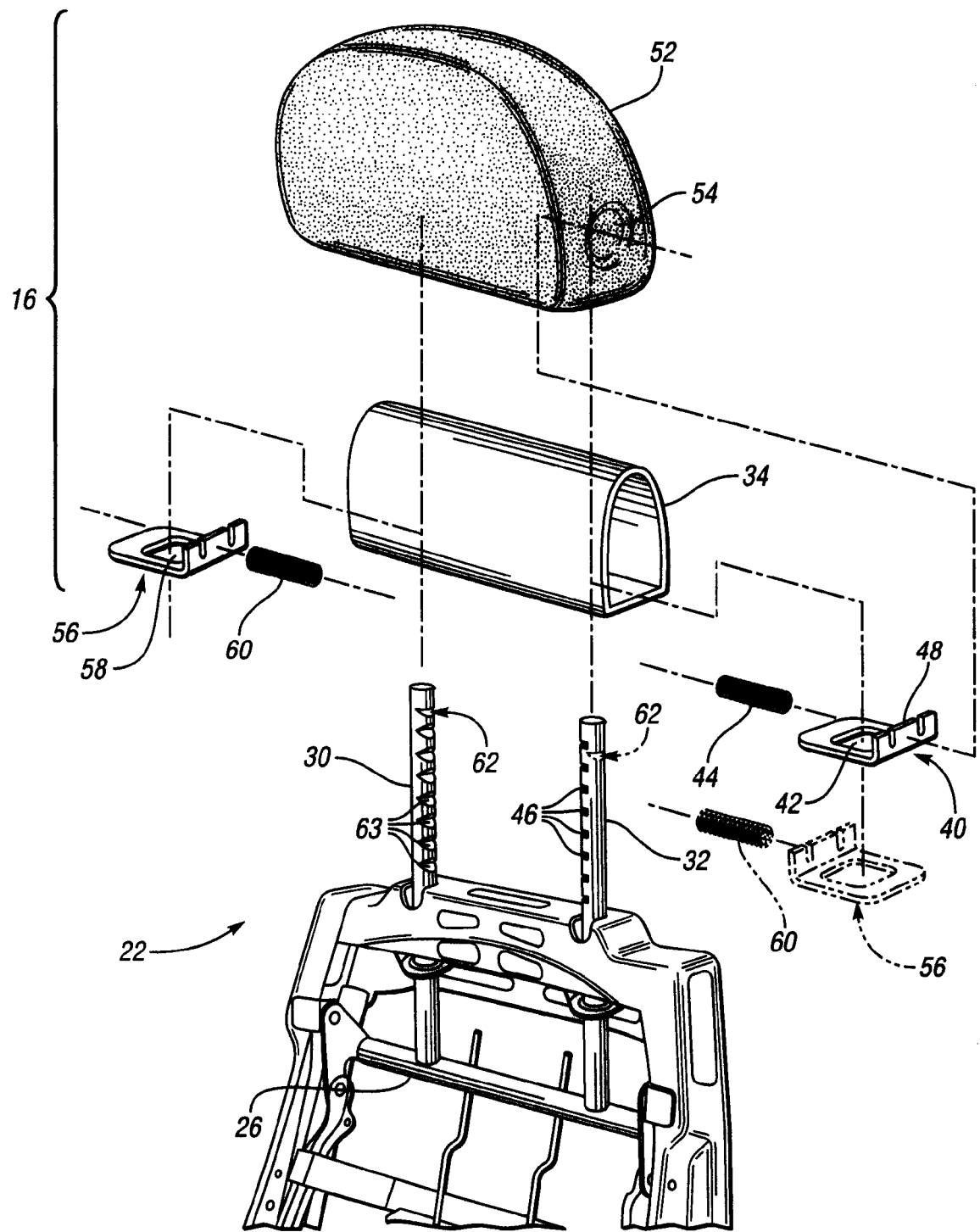
FIG. 3 is an exploded view of a head restraint of the vehicle seat of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIGS. 1 and 2, a vehicle seat is illustrated in accordance with the present invention and is referenced generally by numeral 10. The vehicle seat 10 includes a seat bottom 12 secured to a floor of the vehicle for seating an occupant upon the seat bottom 12. A seatback 14 extends from the seat bottom 12 and is secured relative to the seat bottom 12 for supporting the back of the occupant against the seatback 14. The seat 10 also includes a head restraint 16 extending above the seatback 14 for supporting the head of the occupant against the head restraint 16.

In one embodiment, the seatback 14, which is illustrated with a cover and padding removed for depicting internal components, includes a frame 18 for providing the structural support for the seatback 14. The seatback 14 may include an adjustable lumbar support mechanism 20 for providing lumbar support to the occupant, while providing adjustability so that the occupant can select the desired level of comfort and support. The lumbar mechanism 20 may be an input for an active head restraint system 22 and therefore may be connected to a linkage 24. Receipt of an impact or rebounding from a frontal impact, may cause the body of the occupant to apply a force to the lumbar mechanism 20 that exceeds a predetermined force, thereby actuating the linkage 24. The output of the linkage 24 may be the head restraint 16, such that the head restraint 16 is translated forward and upward relative to the seat back 14.

The output of the linkage 24 may include an armature 26 that extends transversely across the frame 18. The armature 26 is connected with linkage 24 for pivoting about an offset axis 28. Actuation of the armature 26 as represented by arcuate arrow A, results in an enlarged translation of the head restraint 16 which is generally forward and upward as depicted by larger arrow H.

A pair of tubes 30, 32 are provided extending from the armature 26. Unlike prior art head restraints, the tubes 30, 32 extend from the seatback 14. The prior art head restraints typically include a rod extending into the seatback and into a pair of tubes in the head restraint system. Such prior art systems often provide adjustability of the head restraint 16 by translation of the rods within the tubes. Due to these elongated cantilevered rods extending into elongated tubes of prior art systems, acoustical vibrations, commonly referred to as buzz, squeak and rattle, are common difficulties in prior art systems that detract from the comfort provided by the vehicle seat. Such difficulties are avoided by the head restraint system 22 of the present invention by mounting the head restraint 16 directly to the distal ends of the tubes 30, 32 that extend from the seatback 14.

Prior art head restraint systems often provide a locking mechanism on the top of the seatback for locking the head restraint rods relative to the seatback. The placement of the locking mechanisms in the prior art may be difficult for a user to access by requiring the user to reach between the head restraint and the seatback for adjusting the head restraint. Additionally, such locking mechanisms may obfuscate the ornamental appearance provided by the vehicle seat by exposing the locking mechanism to an automotive interior environment.

Accordingly, the present invention provides, in one embodiment, the head restraint 16 for adjustment upon the tubes 30, 32 through a plurality of positions, such as the positions illustrated in FIGS. 1 and 2. Thus, the occupant may adjust the head restraint 16 to a desired height based on the occupant's physical characteristics or comfort preferences. Further, the head restraint 16 may include an internal locking mechanism disposed within the head restraint 16 for locking the head restraint 16 at the desired height.

Referring now to FIG. 3, an embodiment of the head restraint 22 is illustrated partially disassembled in an exploded view for revealing internal components of the head restraint 16. In one embodiment, the head restraint 16 includes a frame 34. The frame 34 is generally tubular and it may be formed from a high strength material, such as stamped or extruded steel, or other suitable metal. The frame 34 extends transversely across the seatback 14 and includes a pair of apertures 36, 38 (FIG. 4) formed in its underside for receiving the tubes 30, 32.

A locking mechanism may be provided within the frame 34. The locking mechanism includes a locking plate 40 with an aperture 42 formed therethrough for receiving the tube 32. The locking plate 40 is fixed for lateral translation within the frame 34. Any suitable biasing member, such as a compression spring 44 may be mounted to the frame 34 and the locking plate 40 for urging the plate 40 against the tube 32. The tube 32 includes a series of indents 46 formed on its inboard side such that the plate aperture 42 engages one of the indents 46 and locks the frame 34 relative to the tube 32. The plate 40 may include a tab 48 extending to face an outboard side of the frame 34 for actuation by the occupant. Thus, the occupant may press the tab 48 inboard, thereby disengaging the plate 40 from one of the indents 46 for translating the head restraint 16 along the tubes 30, 32 until a desired height is reached. Once the user releases a manual force upon the tab 48, the compression spring 44 returns the plate 40 to a locked position in engagement with one of the indents 46.

The head restraint frame 34 is covered with padding such as foam 50 (FIG. 4) and a cover 52. The cover 52 may be a trim cover that is formed from leather, vinyl, fabric, or any suitable textile. The cover 52 may include an unlock region 54 that is displaced over the tab 48 of the locking plate 40 to indicate the location of the locking plate 40. The unlock region 54 may be formed from a second material, such as a fabric of another color or material to identify the unlock region 54. Thus, the occupant may adjust the head restraint 16 by depressing the unlock region 54, thereby actuating the locking plate 40. Alternatively, the unlock region 54 may be formed from the same fabric as the cover 52 and the unlock region 54 may employ any suitable form of indicia for identifying the unlock region 54. For example, the unlock region 54 may include indicia that is sown, stamped, printed, molded, adhered or otherwise displayed upon the unlock region 54.

The occupant may desire to adjust the height of the head restraint 16 during operation of the vehicle. This situation may involve the occupant reaching for the unlock region 54 without looking for the unlock region 54. Therefore, the unlock region 54 may have a tactile surface that differs in surface characteristics from the cover 52 to assist the occupant in locating the unlock region 54 by touch. The differing tactile surface may be generated by a second material, by indicia or any suitable change in feel. Alternatively, the locking mechanism may include an indicator for notifying the occupant that the occupant has depressed the unlock region 54. For example, an audible alarm or vibrating mechanism may be incorporated into the locking mechanism for notifying the occupant by sound or vibration that the unlock region 54 has been depressed.

As illustrated in FIG. 3, a second locking plate 56 may be provided within the frame 34. The second locking plate 56 may include an aperture 58 for receiving the tube 30. A compression spring 60 may be provided for cooperating with the frame 34 for extending the locking plate 56 into engagement with the tube 30. The tube 30 may include one indent 62 on its inboard side that is ramped in a downward orientation. The indent 62 may be provided at an upward region of the tube 30 for engagement with the locking plate 56 for preventing the frame 34, and consequently the head restraint 16, from being removed from the tubes 30, 32. The locking plate 56 may be inaccessible to the occupant to prevent removal of the head restraint 16 from the tubes 30, 32. The indent 62 may be inclined in the downward direction such that the locking plate 56 may be disengaged from the indent 62 by pushing the head restraint 16 downward relative to the tubes 30, 32. Thus, although the locking plate 56 cannot be accessed by the occupant, the locking plate 56 may be utilized for preventing the head restraint 16 from being disassembled from the seatback 14.

Additionally, the left side tube 30 may include a series of indents 63 that are ramped in both vertical directions and that are aligned with the indents 46 of the right side tube 32. The ramped indents 63 provide a detent mechanism for partial retention of the head restraint 16 relative to the left side tube 30 and for enhancement of positioning of the head restraint 16 relative to a locking indent 46 of the right side tube 32.

In another embodiment, multiple locking plates may be employed with a common tube. For example, right side tube 32 may include an indent 62 formed on the outboard side of the tube 32 and ramped in a downward direction as illustrated in phantom in FIG. 3. Another locking plate, such as locking plate 56 and spring 66 (FIG. 3 phantom), may cooperate with the tube 32 for engagement with the indent 62 at a maximum height of the head restraint 16 to prevent further upward travel and to prevent removal of the head restraint from the tubes 30, 32. The second locking plate 56 may be spaced axially from the first locking plate 40 within the frame 34. Thus, multiple features such as locking and anti-removal can be provided on a common tube 32. Likewise, redundant locking on both tubes 30, 32 can be provided for additional stability and/or redundant anti-removal can be provided on both tubes 30, 32 to prevent removal of the head restraint 16.

Figure 4:
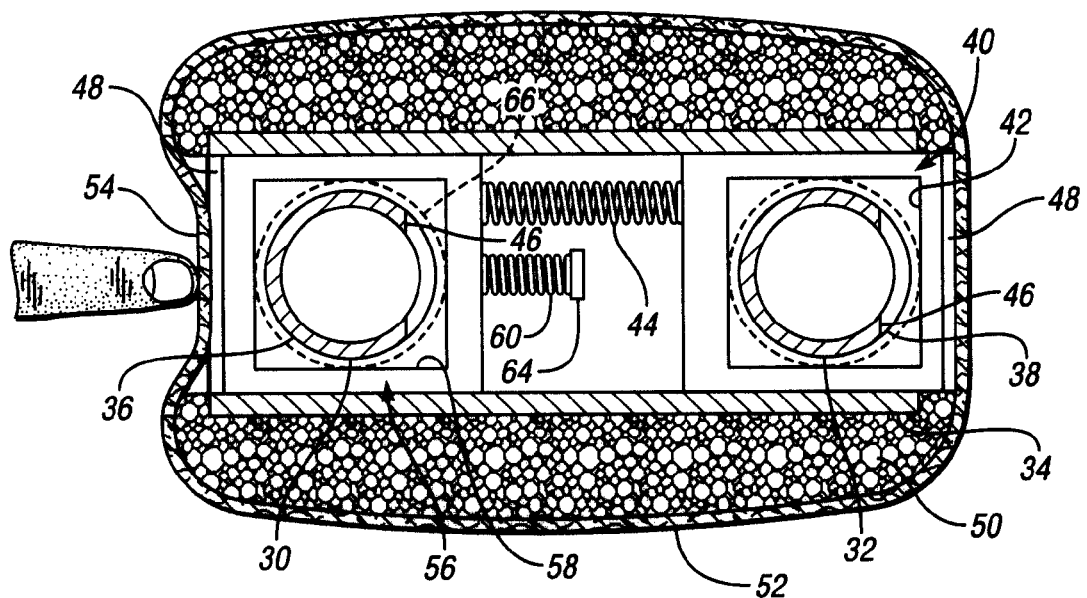
FIG. 4 is a section view of a head restraint of the vehicle seat of FIG. 1.

Alternatively, and with reference to FIG. 4, both locking plates 40, 56 may be oriented adjacent to open tubular ends of the frame 34, with one of the tabs 48 of the locking plates 40, 56 facing laterally outboard for manual actuation by the occupant. Thus, the left side tube 30 of FIG. 3 may also include a series of indents 46 for receiving the locking plate 56. Further, the indents 46 in the right side tube 32 may be provided on the outboard side so that both locking plates 40, 56 may be unlocked by actuation in a common direction. By locking the head restraint 16 to both tubes 30, 32, a stable locked orientation of the head restraint 16 may be provided.

As illustrated on the left side of FIG. 4, the compression spring 60 is mounted to the second locking plate 56 and a bracket 64 of the frame 34. The compression spring 60 urges the locking plate 56 to an outboard direction such that the locking plate 56 extends within one of the indents 46 in the tube 30. In this locked orientation, the tab 48 of the second locking plate 56 is displaced laterally outboard relative to the unlock region 54 on the trim cover 52. The coil spring 44 connects the first and second locking plates 40, 56 so that when the compression spring 60 urges the second locking plate 56 to the outboard direction, the coil spring 44 operates as an extension spring pulling the first locking plate 40 into engagement with the right side tube 32. The coil spring 44 also provides compliancy between the locking plates 40, 56 to overcome any slight misalignment of the locking plates 40, 56 and the corresponding indents 46 of the respective tubes 30, 32. Of course, the invention contemplates that the locking plates 40, 56 may be formed integrally as a common locking plate that cooperates with both tubes 30, 32 simultaneously.

As illustrated on the lefthand side of FIG. 4, the user may depress the contact region 54, thereby actuating the tab 48 of the second locking plate 56, and disengaging the locking plate 56 from the indent 46. In this orientation, the locking plate 56 is translated to the right and disengaged from the tube 30 as illustrated in FIG. 4. As the second locking plate 56 is actuated to the right, the coil spring 44 operates in compression thereby urging the first locking plate 40 to the right for disengaging from the indent 46 of the tube 30 as depicted in FIG. 4. Consequently, as both locking plates 40, 56 are disengaged from the tubes 30, 32 for the embodiment of FIG. 4, the head restraint 16 may be translated along the tubes 30, 32.

To provide bearing support between the frame 34 and the tubes 30, 32, a pair of bushings 66 may be provided, each mounted to the frame 34 and displaced about the tubes 30, 32 for reducing friction therebetween. Unlike prior art head restraint rods, or seatback receptacles, the bushings 66 do not extend along the length of translation of the head restraint rods; therefore minimizing acoustical vibrations associated with buzz, squeak and rattle, and enhancing the comfort provided by the head restraint 16.

By obviating the need for head restraint rods, which are typically provided within tubes of prior art head restraints, a total number of components of the head restraint may be reduced, such as the head restraint system 22 illustrated in the various embodiments. By reducing the total number of components, the mass of the head restraint system 22 are reduced; and the costs associated with materials, manufacturing components, and assembling the head restraint system are reduced. By reducing the mass of the head restraint 16, less effort is required by the occupant to raise the head restraint 16. Further, by providing the tubes 30, 32 as hollow tubes 30, 32 as illustrated in FIG. 4, wiring, cables, or the like may be routed through the tubes 30, 32 for cooperation with other features that may be incorporated into the head restraint 16, such as speakers, a rear display, or the like.

Additionally, the head restraint 16 provides a head restraint system wherein the locking mechanism is discreetly enclosed within the head restraint 16, for example, enclosed within the trim cover 52, for streamlining the design of the head restraint 16 while integrating adjustability into the head restraint 16.

Design constraints of some vehicles require that the head restraint is assembled to the seatback after the seatback is assembled within the vehicle. These design constraints may require a reduced dimension in a height direction of the vehicle seat 10. Likewise, the tubes 30, 32 may be provided to temporarily translate relative to the armature 26. Thus, the tubes 30, 32 may be at least partially retracted within the seatback 14 for assembly and subsequently be extended and locked in the extended position for assembly of the head restraint 16 to the seatback 14.

Figure 5:
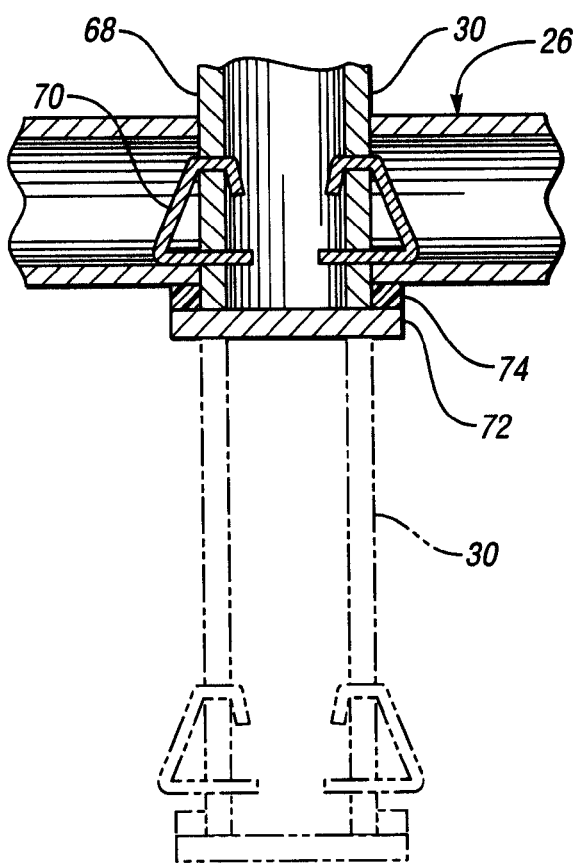
FIG. 5 is a section view of a portion of a head restraint embodiment in accordance with the present invention.

Referring now to FIG. 5, the armature 26 may include a bore 68 formed therethrough for receiving one of the tubes, such as tube 30. The tube 30 may extend through the bore 68 to a lower orientation as illustrated in phantom in FIG. 5 for a pre-assembly position. Once the seatback 14 is assembled within the vehicle, the tube 30 may be translated upward and locked into an extended position relative to the armature. The tube 30 may include a pair of leaf springs 70 mounted thereto that are compressed by the bore 68 during translation for extending into the armature 26. Once the leaf springs 70 pass a wall thickness of the armature 26, the leaf springs 70 may extend as illustrated in FIG. 5, thereby locking the tube 30 to the extended position.

The bottom of the tube 30 may include an end cap 72 for preventing the tube 30 from being translated past the extended position and thereby preventing disassembly of the head restraint system 22. Additionally, an elastomeric pad 74 may be provided between the tube 30 and the armature 26 to prevent acoustical vibrations between the engagement of the armature 26 and the tube 30.

In summary, a head restraint and vehicle seat are disclosed that provide adjustability of the head restraint relative to the seatback while integrating the locking mechanism into the head restraint, minimizing parts, mass and costs while reducing distracting vibrations and incorporating the adjustment into an active head restraint mechanism.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint system for a vehicle seat comprising:
   a pair of rods adapted to be fixed relative to a vehicle seat, each of the pair of rods provided with a series on indents formed therealong;
   a frame mounted to distal ends of the pair of rods;
   a head restraint mounted to the frame for axial translation along the pair of rods; and
   a locking mechanism for locking the head restraint at a plurality of locations along the pair of rods;
   wherein the locking mechanism comprises a pair of plates, each fixed for translation in the frame and each plate is sized to be received within the indents of one of the rods for locking the head restraint relative to the pair of rods, a first biasing member and a second biasing member, each for biasing one of the plates into engagement with one of the plurality of rod indents in absence of a manually applied force;
   wherein the first plate further comprises a tab oriented laterally outboard relative to the frame for access by the occupant for manual actuation of the plate to an unlocked orientation; and
   wherein the second plate further comprises a tab, with the second biasing member extending between the two tabs of the two plates such that when the occupant actuates the first plate to an unlocked orientation, the first plate actuates the second biasing member, which consequently actuates the second plate to an unlocked position.

2. The head restraint system of claim 1 further comprising a cover displaced about the head restraint and the locking mechanism.

3. The head restraint system of claim 1 further comprising:
   padding displaced about the frame; and
   a cover displaced about the padding.

4. The head restraint system of claim 3 wherein the cover further comprises a trim cover formed from a first material for receiving the occupant's head and a lock cover formed from a second material and displaced over the tab of the first plate for indicating the location of the locking mechanism.

5. The head restraint system of claim 1 further comprising:
   a restraint mechanism adapted to be mounted in a vehicle seat frame for actuating in response to an impact condition; and
   an armature in operable cooperation with the restraint mechanism for being actuated by the restraint mechanism, the armature being in operable cooperation with the pair of rods such that the armature translates the head restraint in a forward direction relative to the seatback during the impact condition.

6. The head restraint system of claim 5 wherein the pair of rods are mounted to the armature.

7. The head restraint system of claim 1 wherein the frame is tubular and extends transversely with a pair of apertures formed therethrough such that the distal ends of the pair of rods extend into the frame.

8. The head restraint system of claim 1 wherein the tab of the second plate is oriented laterally inboard relative to the frame.

9. The head restraint system of claim 1 further comprising a second locking mechanism for preventing the user from removing the head rest from the pair of rods.

10. A vehicle seat comprising:
    a seat bottom for supporting an occupant seated thereon;
    a seatback extending from the seat bottom for supporting the back of the occupant;
    a frame provided in the seatback;

a restraint mechanism mounted in the frame for actuating in response to an impact condition;

an armature mounted to the seat frame, the armature being in operable cooperation with the restraint mechanism for being actuated by the restraint mechanism;

a pair of rods extending from the armature above the seatback, the pair of rods being axially translatable relative to the armature for at least partially retracting into the seatback during assembly of the vehicle seat, and for subsequently extending to a design position;

a head restraint mounted to the pair of rods such that the armature translates the head restraint in a forward direction relative to the seatback during the impact condition, the head restraint being translatable along the pair of rods for adjustment of the head restraint relative to seatback;

a first locking mechanism for locking the head restraint at a plurality of locations along the pair of rods; and a second locking mechanism cooperating with the pair of rods and the armature for locking the pair of rods in the design position;

wherein the second locking mechanism further comprises a pair of leaf springs each mounted to one of the rods for engaging the armature in the design position.

11. The vehicle seat of claim 10 wherein the head restraint is sleeveless for reducing acoustical vibrations between the head restraint and the pair of rods.

12. The vehicle seat of claim 10 further comprising an elastomeric pad oriented between the rod and the armature for reducing acoustical vibrations between the engagement of the rod and the armature.

\* \* \* \* \*